United States Patent [19]

Hess et al.

[11] Patent Number: 5,226,627
[45] Date of Patent: Jul. 13, 1993

[54] MAGNETIC VALVE

[75] Inventors: Juergen Hess, Baden-Baden-Steinbach; Claudius Muschelknautz, Lauf, both of Fed. Rep. of Germany

[73] Assignee: Robert Bosch GmbH, Stuttgart, Fed. Rep. of Germany

[21] Appl. No.: 965,223

[22] Filed: Oct. 23, 1992

[30] Foreign Application Priority Data

Dec. 4, 1991 [DE] Fed. Rep. of Germany ....... 4139958

[51] Int. Cl.⁵ .................. F16K 31/08; F16K 11/044
[52] U.S. Cl. ........................... 251/65; 137/625.65; 137/625.44; 251/129.2
[58] Field of Search ............... 251/65, 129.2; 137/625.65, 625.27, 625.44

[56] References Cited

U.S. PATENT DOCUMENTS

| | | | |
|---|---|---|---|
| 3,379,214 | 4/1968 | Weinberg | 251/65 |
| 3,790,127 | 2/1974 | Reip | 251/129.2 |
| 4,574,841 | 3/1986 | Hügler | 137/625.65 X |

Primary Examiner—Arnold Rosenthal
Attorney, Agent, or Firm—Michael J. Striker

[57] ABSTRACT

A magnetic valve has a valve chamber having at least one valve opening, a valve member adapted to close and to release the at least one opening in its abutment position, an actuating element displaceable between two end positions in the valve chamber and actuating the valve member, a permanent magnet associated with the actuating element and holding the actuating element in the end positions. The permanent magnet is magnetized in a direction of displacement of the actuating element and has two ends extending transversely to the displacing direction and provided with pole pieces. An electromagnet produces a magnetic force which displaces the actuating element between the positions, and the electromagnet has a magnetic core with three parallel legs connected by a transverse yoke and including two outer legs connected with end stops in magnetically conductive manner and a central leg extending to the actuating element and also having an operating winding arranged on the central leg. The pole pieces in association with the central leg of the magnetic core and the end stops are formed so that alternatingly in each abutting position of the actuating element one pole piece abuts without gap against the central leg while another pole piece abuts without gap against one of the stops with an abutment surface extending transversely to the displacing direction.

15 Claims, 1 Drawing Sheet

MAGNETIC VALVE

BACKGROUND OF THE INVENTION

The present invention relates to a magnetic valve.

More particularly, it relates to a magnetic valve which has an actuating element displaceable in a valve chamber between two end positions for a valve member for closing and releasing at least one valve opening, a permanent magnet arranged in the actuating element for holding the actuating element in the end positions, pole members arranged at both end sides of the actuating member, a transverse yoke, and an operating winding.

Magnetic valves of the above mentioned general type are known in the art. One of such magnetic valves is disclosed for example in the German document DE 4,000,071 A1. A known so-called bistable magnetic valve disclosed in this reference has an actuating element and a valve member combined to a valve piston. It is composed of a centrally arranged disc-shaped permanent magnet, two soft iron rings abutting against each disc surface of the permanent magnet and having central openings filled with elastomeric filling pieces and a sleeve shaped guiding cage which surrounds the permanent magnet and both soft iron rings undisplaceably. The end stops are formed as ferromagnetic closure pieces arranged coaxially on both sides of the valve piston at a distance from it and having central closure openings with mouths forming valve openings in the valve chamber. The end sides of the closure pieces which face the valve piston are formed as valve seats which cooperate with the elastomeric filling pieces in the soft iron rings for closing and releasing the valve openings. The guiding cage projects beyond the end of the soft iron ring so far that it slides in each displacement position of the valve piston on the closure pieces which are outwardly provided with guiding surfaces. The valve piston extends during its displacement movement through a circular opening in the central leg of the magnetic circuit, whereby a ring gap is produced between the central leg and the valve piston. In each abutment position of the actuating element the magnetic circuit of the permanent magnet which holds the actuating element with the valve member in its abutting position is closed through a soft iron piece, the associated end stop, the outer leg of the magnet core connected with it, the central leg of the magnet core, the ring gap remaining between the central leg and the valve piston, and the other soft iron piece. In order to maintain the magnetic voltage drop in the air gap low, narrow or tolerance limits must be maintained. This increased the manufacturing cost and affects the robustness of the magnetic valve.

SUMMARY OF THE INVENTION

Accordingly, it is an object of the present invention to provide a magnetic valve which avoids the disadvantages of the prior art.

In keeping with these objects and with others which will become apparent hereinafter, one feature of the present invention resides, briefly stated, in a magnetic valve of the above mentioned type in which both pole pieces in association to the central leg of the magnet core and the end stops are formed so that alternatingly in each abutment position of the actuating element one pole piece on the center leg and another pole piece on one of the end stops abuts with an abutment surface extending transverse to the displacement direction in air gapless manner.

When the magnetic valve is designed in accordance with the present invention, the magnetic circuit of the permanent magnet in the abutment positions of the actuating element is air gap-free and thereby the holding forces are substantially increased. The problem-prone ring gap between the actuating element and the central leg is dispensed with since the magnetic circuit is closed directly from the central leg through the respective abutment surface extending transverse to the displacement direction on the pole piece plainly abutting against the central leg.

Moreover, the switching condition of the magnetic valve is substantially improved since a double force engagement is performed on the pole pieces. Due to the inventive construction one pole piece is pushed from the end stop and pulled by the central leg and simultaneously the other pole piece is pulled by the other end stop and pushed from the central leg, and vice versa. The magnet valve in accordance with the present invention can in addition be built very simple and the manufacturing sense, by simple punched bending parts and synthetic plastic parts.

In accordance with another advantageous embodiment of the present invention, the permanent magnet with its both pole pieces is mounted on a carrier which is axially displaceably held in the valve chamber. Both pole pieces extend beyond the permanent magnet toward the central leg so far that with their projecting surfaces extending transverse to the displacement direction of the carrier they can alternatingly abut against the central leg and the outer leg of the magnetic core, forming the associated end position for the pole piece. The carrier can be formed preferably trough-like, and the pole pieces with the permanent magnet located therebetween are inserted into the carrier in the form-locking manner from above. The projections which are bent from the carrier valves serve for fixing the pole pieces and the permanent magnets in the trough-shaped carrier.

In order to provide substantially friction-free displaceable support of the carrier in the valve chamber, the carrier is held by two turning brackets arranged at a distance from one another. It is preferable that the turning brackets are turnably held at the lower side of the trough-shaped carrier and on the lower side of the winding carrier for the operating winding which faces the actuating element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
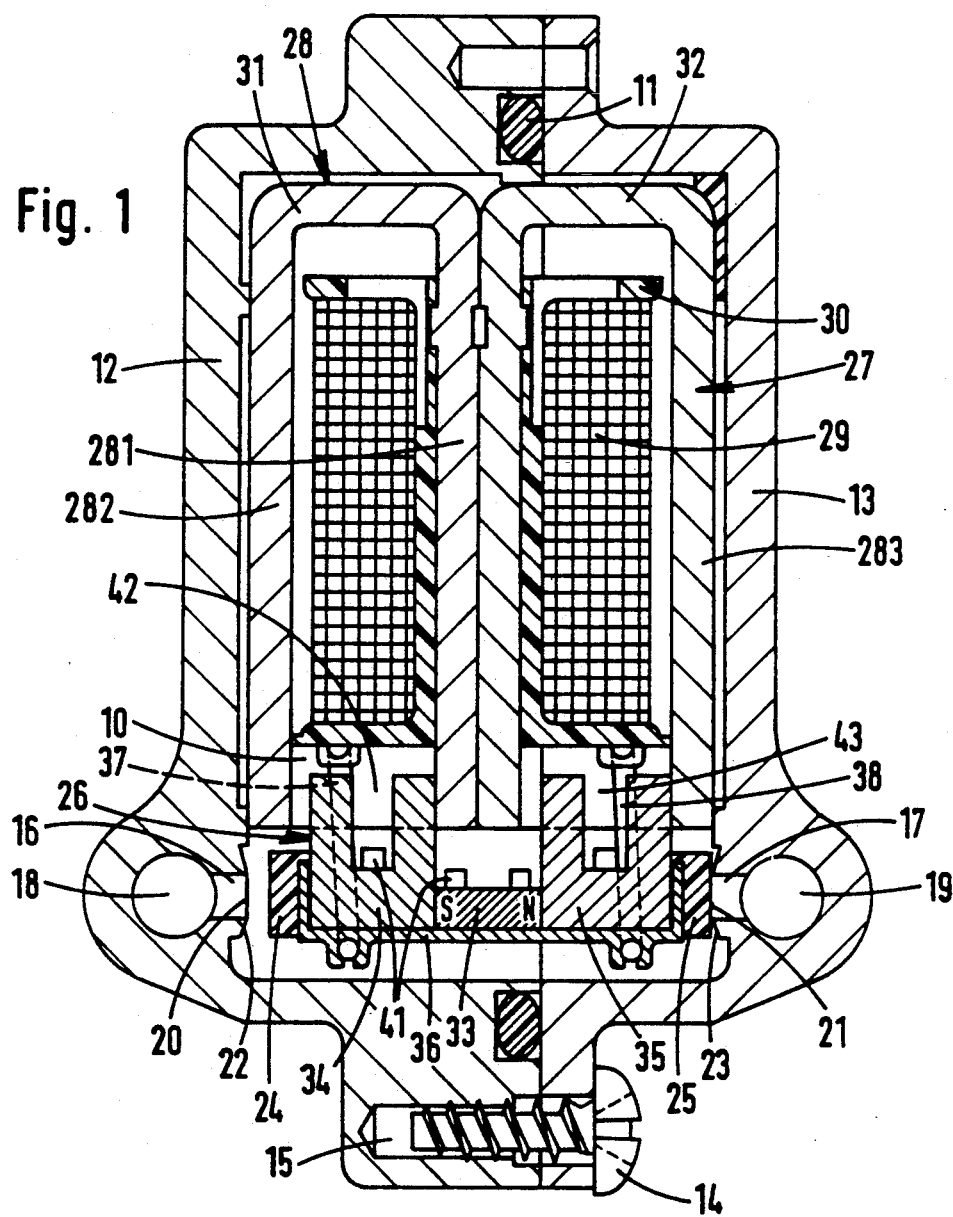
FIG. 1 is a view showing a longitudinal section of a magnetic valve in accordance with the present invention.

A bistable magnetic valve shown in a longitudinal section in FIG. 1 has a valve chamber 10 which is enclosed by two housing parts 12 and 13. The housing parts fluid-tightly abut against one another with interposition of a sealing ring 11. The housing parts 12 and 13 are pretensioned relative to one another by screws 14 which are screwed in openings 15 in the housing part 12.

Each housing part 12 and 13 has a transverse opening 16 and 17 which opens at one side with a connecting opening 18 and 19 and opens in a valve chamber 10 on the other side. With the assembled housing parts 12 and 13, the transverse openings 16 and 17 coincide with one another. The mouths of the transverse openings 16 and 17 form valve openings 20 and 21 of the magnetic valve in the valve chamber 10. The valve openings 20 and 21 are surrounded by valve seats 22 and 23 which are formed on the housing parts 12 and 13.

Valve members 24 and 25 cooperate with the valve seats 22 and 23 for closing and releasing the valve openings 20 and 21. The valve members 24 and 25 are arranged coaxially relative to the valve openings 20 and 21 and held on an actuating element 26 which is axially displaceable in the valve chamber 10 between two end stops. The connecting openings 18 and 19 are provided conventionally for connection to a pressure sink and a pressure source. A passage which is not seen there and also opens into the valve chamber is connected with a further connecting opening which forms a working connection of the magnetic valve.

An electromagnet 27 for driving the actuating element 26 is provided in the valve chamber and clamped between the housing parts 12 and 13. The electromagnet 27 is composed in a known manner of a substantially E-shaped magnetic main core 28 as seen in longitudinal cross-section, and an operating winding 29 which is wound on a winding carrier 30 of insulating material. The winding carrier 30 which has a double-T-shaped cross-section is fitted on the central leg 281 of the magnet core 28 and extends with its both transverse flanges parallel to the transverse yoke which connects the three parallel legs 281-283 of the magnet 28 to the vicinity of the inner wall of the outer legs 282 and 283. The magnet core 28 is composed of two U-shaped flux guiding metal sheets 31 and 32. The central legs 281 of the magnet core 28 are formed by two inner U-legs of the flux guiding metal sheets 31 and 32 abutting against one another, and the outer legs 282 and 283 of the magnet core 28 are formed by the outer U-legs of the flux guiding metal sheets 31 and 32. The three legs 281-283 of the magnet core 28 have the same length and end at a distance from the valve openings 20 and 21, so that the closing property of the valve member 24 and 25 is not affected.

Figure 2:
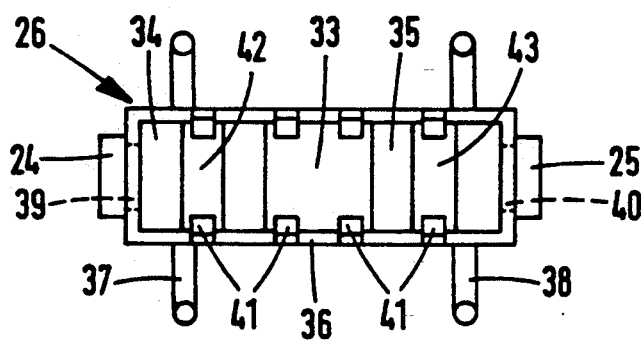
FIG. 2 is a plan view of an actuating element with a valve member of the magnetic valve of FIG. 1.

The actuating element 26 includes a permanent magnet 33 which is magnetized in the displacement direction and has poles N and S and two pole pieces 34 and 35 arranged at both sides on the permanent magnet 33. As shown in FIGS. 1 and 2, the permanent magnets 33 and the pole pieces 34 and 35 are received in a trough-shaped carrier 36 in a form-locking manner. The permanent magnet 33 and the pole piece 34 and 35 are inserted into the trough-shaped carrier 36 from above. The carrier 28 is held in the valve chamber 10 axially displaceable. For this purpose two turning brackets 37 and 38 are provided and arranged at a distance from one another. They are held turnably on the one hand on the lower side of the carrier 36 and on the other hand on the lower side of the lower transverse flange of the winding carrier 30 which faces the actuating element 26. The pole pieces 34 and 35 extend over the upper edge of the carrier 36 and into the intermediate space between the central leg 281 on the one hand and both outer legs 282 and 283 on the other hand.

The longitudinal dimensions of the pole pieces 34 and 36 in the displacement direction of the carrier 36 is selected so that in one abutment position shown in FIG. 1 one pole piece 34 with its projecting surface which extends transverse to the displacement direction of the carrier 36 abuts plainly against the central leg 281, while another pole piece 35 with its projecting surface extending transverse to the displacement direction of the carrier 26 abuts against the outer leg 283.

When the carrier 36 is displaced axially so far that the valve opening 20 is closed and the valve opening 21 is released, the pole piece 34 abuts against the outer leg 282 and the pole piece 35 abuts against the central leg 281. The end abutment for the displacement movement of the actuating element 26 is thereby formed by the outer legs 282 and 283. The valve members 24 and 25 are formed as elastomer pieces which is mounted on the end sides of the carrier 36 so that they extend into the wall passages 39 and 40 and are there for example glued.

The mounting of the permanent magnets 33 and the pole pieces 34 and 35 in the trough-shaped carrier 36 is performed by projections 41 which are bent from the carrier walls and clamped on the outer surface of the permanent magnet 33 and the pole pieces 34 and 35. In order to form the pole pieces 34 and 35 which project far from the carrier 36, it has recesses 42 and 43 which extend to the region under the upper edge of the carrier wall. The projections 41 which are bent from opposite carrier walls are clamped at the bottom of the recesses 42 and 43.

The above described magnet valve operates in the following manner:

The permanent magnet 33 produces a magnetic flux which extends in the position of the actuating element shown in FIG. 1 from the north pole N of the permanent magnet 33 through the pole piece 35 to the outer leg 283 of the magnet core 28 and from there back to the south pole S of the permanent magnet 33 both through the central leg 281 and through the outer leg 282 of the magnet core 28 and the pole piece 34. In addition, a magnetic flux of the permanent magnet 33 extends from the north pole end directly through the pole piece 35 to the central leg 281 and from there back through the pole piece 34 to the south pole S of the permanent magnet 33. Since the gapless distance of the pole piece 35 from the outer leg 283 and the gapless distance of the pole piece 34 from the central leg 281 is substantially smaller than the distance of the pole piece 34 from the outer leg 282 as well as the pole piece 35 from the central leg 281, the flux density and thereby the attraction force between the pole piece 35 and the outer leg 283 on the one hand as well as between the pole piece 34 and the central leg 281 on the other hand is substantially greater than the distance between the outer leg 282 and the pole piece 34 as well as the pole piece 35 and the central leg 281. The actuating element 26 is thereby retained in its end position shown in FIG. 1 in which the valve opening 21 is closed by the valve member 25 and the valve opening 20 is released by the valve member 24. Therefore fluid can discharge from the valve chamber 10 through the open valve opening 21 when the connecting opening 18 is connected with a pressure sink. When a pressure source is connected with the connection opening 18, fluid flows into the valve chamber 10.

When the magnet valve must be switched, the electromagnet 27 is energized with such a polarity that a magnetic flux is produced to counteract and to weaken the above described magnetic flux between the pole piece 34 and the central leg 281 on the one hand, and the pole piece 35 and the outer leg 283 on the other hand. Simultaneously this flux produced by the electromagnet 27 reinforces the permanent magnetic flux between the outer leg 282 and the pole piece 34 as well as between the central leg 281 and the pole piece 35. Since now the field density and the attraction force between the outer leg 282 and the pole piece 34 as well as between the central leg 281 and the pole piece 35 is greater the actuating member 26 moves to the left in FIG. 1 and abuts with its valve member 24 against the valve seat 22. Simultaneously the valve opening 21 is released from the valve member 25. Thereby, the fluid flow from the connecting opening 19 connected with the pressure source is released through the valve opening 21 in the valve chamber 10. Now the electromagnet 27 can again be switched off, since the magnetic flux of the permanent magnet 33 is sufficient to hold the actuating element 26 in the abutting position. This magnetic flux extends in the same way as described hereinabove. The flux density and thereby the traction force between the pole piece 35 and the central leg 281 on the one hand and the pole piece 34 and the outer leg 282 on the other hand is greater than between the pole piece 35 and the outer leg 283 as well as the pole piece 34 and the central leg 281.

It is to be understood that the present invention is not limited to the examples shown. The axial displaceability of the carrier 36 can for example be made different than with the use of the turning bracket 37 and 38. However, this structural embodiment provides for a continuous friction free support of the actuating member 26 in a reliable manner, wherein only low adjusting forces are needed. In deviation from the embodiment of the carrier 36, it can be held for example in guides at the bottom of the valve chamber 10. However, increased friction losses and higher adjusting forces will be taken into consideration.

It will be understood that each of the elements described above, or two or more together, may also find a useful application in other types of constructions differing from the types described above.

While the invention has been illustrated and described as embodied in a magnetic valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A magnetic valve comprising means forming a valve chamber, having at least one valve opening; a valve member adapted to close and to release said at least one opening in its abutment position; an actuating element displaceable between two end positions in said valve chamber and actuating said valve member; a permanent magnet associated with said actuating element and holding said actuating element in said end positions, said permanent magnet is magnetized in a direction of displacement of said actuating element and has two ends extending transversely to said displacing direction and provided with pole pieces; an electromagnet for producing a magnetic force which displaces said actuating element between said positions, said electromagnet has a magnetic core with three parallel legs connected by a transverse yoke and including two outer legs connected with end stops in magnetically conductive manner and a central leg extending to said actuating element and also having an operating winding arranged on said central leg, said pole pieces in association with said central leg of said magnetic core and said end stops are formed so that alternatingly in each abutting position of said actuating element one pole piece abuts without gap against said central leg while another pole piece abuts without gap against one of said stops with an abutment surface extending transversely to the displacing direction.

2. A magnetic valve as defined in claim 1, wherein said three legs of said magnet core have identical lengths, said end stops are formed by free ends of said outer legs.

3. A magnetic valve as defined in claim 1; and further comprising a carrier which is axially displaceable in said valve member, said permanent magnet with said both pole pieces are mounted on said carrier, said pole pieces projecting beyond said permanent magnet to said central leg of said magnet core.

4. A magnetic valve as defined in claim 3, wherein said pole pieces have projecting surfaces which extend transverse to the displacing direction of said carrier and can abut against said central leg or said outer legs.

5. A magnetic valve as defined in claim 3, wherein said carrier is trough-shaped, said pole pieces with said permanent magnet located between them are inserted from above into said trough-shaped carrier in a form-locking manner.

6. A magnetic valve as defined in claim 5, wherein said carrier has carrier walls provided with bent out projections, said pole pieces and said permanent magnets are fixed by said projections of said carrier walls.

7. A magnetic valve as defined in claim 6, wherein said pole pieces extend beyond an upper edge of said carrier walls and have each a recess extending to below an upper edge of the carrier walls, said projections which are bent out from said carrier walls being clamped on an outer surface of said permanent magnet and on a bottom of said recess.

8. A magnetic valve as defined in claim 3; and further comprising means for holding said carrier and including turning brackets arranged at a distance from one another.

9. A magnetic valve as defined in claim 8; and further comprising a coil support on which said operating winding is wound and which has a double-T-shaped cross-section, said coil support is arranged on said central leg, said turning brackets are turnably held on a lower side of said carrier and on a lower side of a lower coil support transverse flange which faces said actuating element.

10. A magnetic valve as defined in claim 3, wherein said at least one valve member is mounted on an end side of said carrier, which extends transverse to said displacing direction.

11. A magnetic valve as defined in claim 10, wherein said at least one valve member is formed as an elastomeric piece.

12. A magnetic valve as defined in claim 1; and further comprising a housing which surrounds said valve chamber and is provided with at least one valve opening formed by an opening provided in said valve chamber and surrounded by a valve seat, said valve seat being formed on said housing, and said valve member being arranged coaxially relative to said valve seat.

13. A magnetic valve as defined in claim 12, wherein said housing is formed as a synthetic plastic housing.

14. A magnetic valve as defined in claim 12, wherein said housing is composed of two housing parts.

15. A magnetic valve as defined in claim 1, wherein said magnet core is composed of two U-shaped flux conducting metal sheets so that two legs associated with each of said flux conducting sheets extend parallel to one another and form said central leg of said magnetic core which holds said operating winding.

* * * * *